United States Patent [19]

Hehl

[11] Patent Number: 4,530,655
[45] Date of Patent: Jul. 23, 1985

[54] MOUNTING ARRANGEMENT FOR DIE CLOSING UNIT OF INJECTION MOLDING MACHINE

[76] Inventor: Karl Hehl, Arthur-Hehl-Strasse 32, 7298 Lossburg 1, Fed. Rep. of Germany

[21] Appl. No.: 443,644

[22] Filed: Nov. 22, 1982

[30] Foreign Application Priority Data

Nov. 20, 1981 [DE] Fed. Rep. of Germany ....... 3145973

[51] Int. Cl.³ .............................................. B29F 1/00
[52] U.S. Cl. ..................................... 425/589; 425/451
[58] Field of Search ...................... 425/451, 589, 450.1, 425/542, 595

[56] References Cited

U.S. PATENT DOCUMENTS

| | | | |
|---|---|---|---|
| 3,117,348 | 1/1964 | Rees | 425/107 |
| 3,254,371 | 6/1966 | Rees | 425/145 |
| 3,344,470 | 10/1967 | Hufford | 425/450.1 |
| 3,579,740 | 5/1971 | Rees | 425/589 |
| 4,090,837 | 5/1978 | Balevski et al. | 425/589 |
| 4,278,306 | 7/1981 | Douglas et al. | 308/6 C |
| 4,309,164 | 1/1982 | Egger et al. | 425/589 |
| 4,315,728 | 2/1982 | Hehl | 425/589 |
| 4,380,427 | 4/1983 | Hehl | 425/590 |
| 4,389,183 | 6/1983 | Laurent et al. | 425/589 |

FOREIGN PATENT DOCUMENTS

| | | | |
|---|---|---|---|
| 2943118 | 5/1981 | Fed. Rep. of Germany . | |
| 1193830 | 11/1959 | France | 308/6 C |
| 556746 | 10/1943 | United Kingdom | 308/6 C |

OTHER PUBLICATIONS

"Industriewerke Schaeffer INA-Wälzlager", D-8522 Herzogenaurach, Germany, Sales Catalog No. 304, Oct. 1979, pp. 122-125.

Primary Examiner—Willard Hoag
Assistant Examiner—James C. Housel
Attorney, Agent, or Firm—Joseph A. Geiger

[57] ABSTRACT

A mounting arrangement for a die closing unit on the machine base of an injection molding machine, where the machine base has two guide rails with parallel horizontal and vertical guide faces welded to the upper edges of its U-shaped base member, the stationary die carrier plate and the stationary cylinder head plate of the die closing unit being positioned and positively centered by the guide faces of the guide rails, and the movable die carrier frame being adjustably guided on the same guide faces. The cylinder head plate is free to execute small displacements along the guide rails, in compensation for the periodic elongation of the tie rods, when the closing pressure is applied to the injection molding die.

15 Claims, 11 Drawing Figures

MOUNTING ARRANGEMENT FOR DIE CLOSING UNIT OF INJECTION MOLDING MACHINE

BACKGROUND OF THE INVENTION

1. Field of the Invention

The present invention relates to injection molding machines and, more particularly, to a mounting arrangement for the die closing unit on the machine base of an injection molding machine in such a way that two longitudinal guide rails on the machine base provide a positive centering relationship between the die closing unit and the machine base.

2. Description of the Prior Art

It is known to arrange longitudinal guide rails on the machine base of an injection molding machine, in order to provide guidance and support for the movable die carrier member of the die closing unit, thereby partially or completely relieving the tie rods of their guidance and weight-supporting function. The advantages of this exterior guidance by means of guide rails are twofold: The guide elements are readily interchangeable, when worn, without the need for removing the movable die carrier member from the machine. The guides are adjustable for precision-alignment of the movable die carrier member with the stationary die carrier member.

An example of such a guide configuration is disclosed in the German Gebrauchsmuster (Utility Model) No. G 81 01 313 which suggests a push-type die closing unit, where the movable die carrier frame is guided on four horizontal tie rods and pushed closed by a single centrally mounted power cylinder. The tie rods extend between a stationary die carrier plate and a likewise stationary cylinder head plate, thus forming a rigid stationary assembly.

The machine base which carries this die closing unit has arranged on its longitudinal upper edges two guide rails which cooperate with guide shoes of the movable die carrier member. The guide shoes are of angular outline, so as to simultaneously engage a horizontal surface of each guide rail, for weight-supporting purposes, and a vertical surface of each guide rail, for lateral support and centering purposes.

The stationary die carrier plate and cylinder head plate are mounted on opposite extremities of the guide rails. In order to obtain the desired weight-supporting and centering action of the guide rails in relation to the movable die carrier member, the die closing unit must be positioned in relation to the machine base in a painstaking and time-consuming alignment procedure. The accuracy of this alignment thus depends on the skill and reliability of the assembly personnel. Consequently, it is virtually always necessary to verify the alignment accuracy at least once, in order to ascertain the absence of human error, experience having shown that even a minute misalignment will have noticeable negative effects on the guidance of the movable die carrier frame.

One negative effect of misalignment between the guide rails and the stationary plates is a marked increase in wear of the guide members. The achievement of precision-alignment is particularly important, when the guide members are of the rolling type, using a row of recirculating bearing rollers which are guided in grooves of a roller bogie, so that a plurality of rollers engage each guide surface of a guide rail. These roller bogies are highly sensitive to any misalignment.

The achievement of a high degree of accuracy and dimensional consistency over the entire production run of a particular injection-molded part depends to a great extent on the precision with which the movable die carrier member is guided in relation to the stationary die carrier member, for an absolutely parallel alignment of the two die halves. It has therefore become an important objective to avoid any deflection of the tie rods which may result from misalignment or misadjustment of the guide engagement between the movable die carrier frame and the guide rails of the machine base.

Lastly, it has also been found that a certain measure of distortion in the die closing unit is produced by the tie rods themselves, as they undergo elongation, when the full closing pressure is applied to the injection molding die by the power cylinder. This pressure exerts itself on the tie rods as a tensile stress which, due to the mounting attachment of the stationary die carrier plate and the cylinder head plate on the machine base, manifests itself in a greater elongation of the upper two tie rods as compared to the lower two tie rods.

SUMMARY OF THE INVENTION

It is a primary objective of the present invention to suggest an improvement in connection with the mounting arrangement of a die closing unit on the machine base of an injection molding machine in such a way that the previously required alignment procedure is replaced by a positive centering coaction between the stationary plates of the die closing unit and the guide rails of the machine base. An additional objective of the invention is the achievement of an even distribution of tensile stress and elongation over all four tie rods, when the maximum die closing pressure is applied.

The present invention proposes to attain these objectives by suggesting a mounting arrangement for a die closing unit on the machine base of an injection molding machine in which the guide rails cooperate with the stationary die carrier plate and with the stationary cylinder head plate in such a way that both plates are positively positioned and centered by the same horizontal and vertical guide faces which provide the guidance for the movable die carrier member.

In a preferred embodiment of the invention, both the machine base and the die closing unit are symmetrical with respect to a vertical longitudinal center plane. The machine base is of heavy-gauge sheet metal, reinforced by edge flanges to which the longitudinal guide rails are welded. Cross members in the immediate vicinity of the extremities of the guide rails provide dimensional stability for the latter. The guide rails themselves are preferably of square cross section, carrying hardened runway strips on their upper and inwardly facing vertical surfaces.

The positive centering of the stationary die carrier plate and of the stationary cylinder head plate between the two guide rails makes it possible to arrange one of the two plates, preferably the cylinder head plate, in a non-clamped engagement with the guide rails, so that the plate will execute small longitudinal displacements to accommodate the periodic elongation of the tie rods under the tensile stress from the die closing pressure. This arrangement assures an even distribution of tensile stress over the four tie rods and the absence of any elongation-caused alignment distortions in the die closing unit.

The proposed positive centering configuration of the die closing unit on the machine base is particulary advantageous in connection with injection molding machines which may be subjected to extraordinary stress and shock during shipment to their final destination, as a result of which the factory-set alignment may be destroyed. This type of shipment risk is present in certain export countries, where inexperienced personnel may be in charge of the equipment.

BRIEF DESCRIPTION OF THE DRAWINGS

Further special features and advantages of the invention will become apparent from the description following below, when taken together with the accompanying drawings which illustrate, by way of example, an embodiment of the invention which is represented in the various figures as follows.

DESCRIPTION OF THE PREFERRED EMBODIMENT

Figure 1:
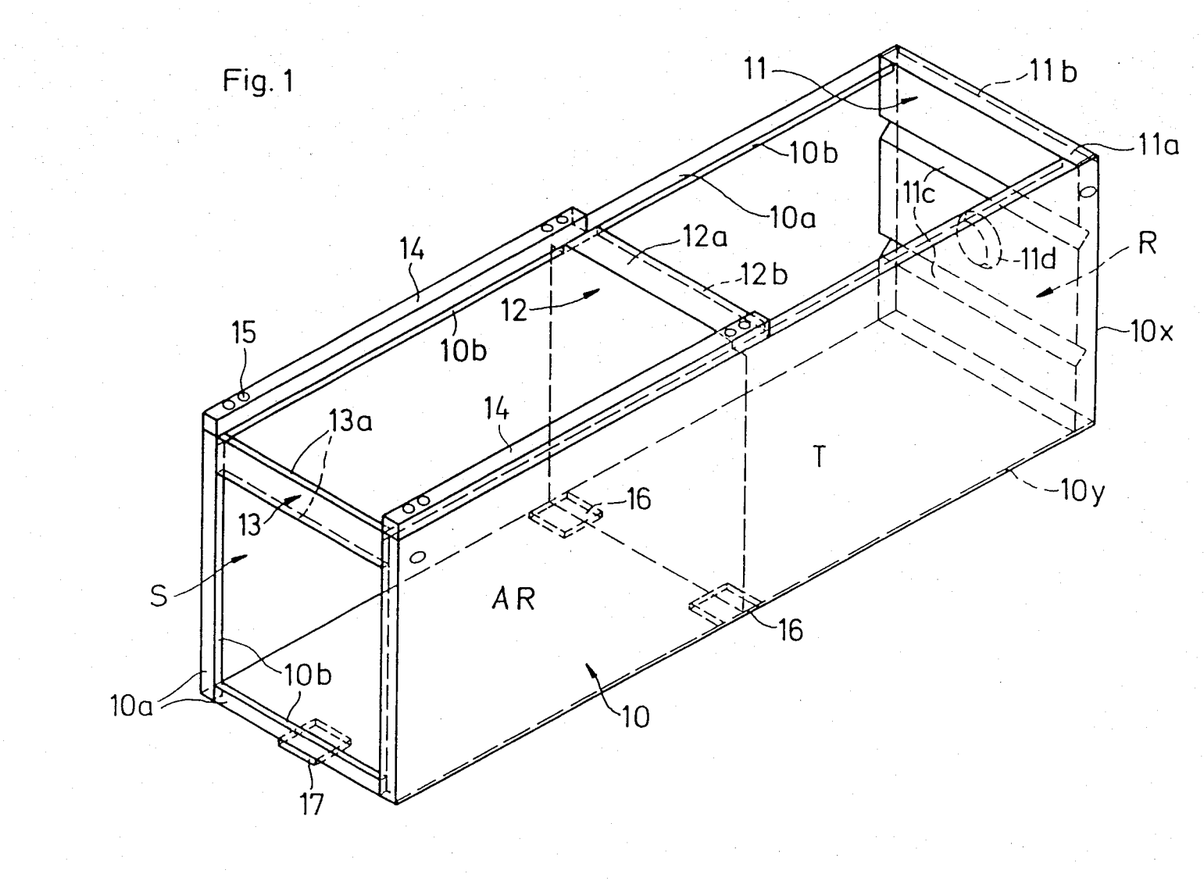
FIG. 1 shows, in a perspective view, a machine base for an injection molding machine adapted for use with the present invention.
Figure 2:
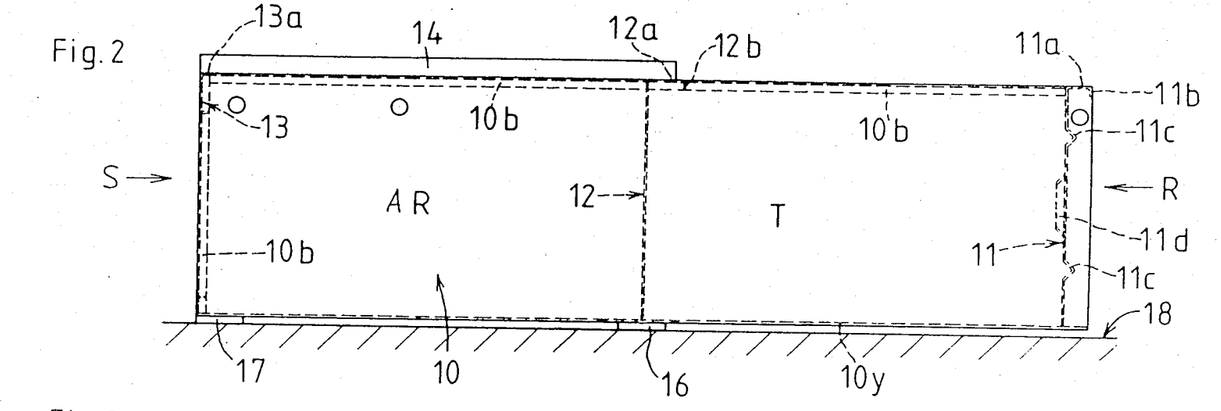
FIG. 2 shows the machine base of FIG. 1 in an elevational view.
Figure 3:
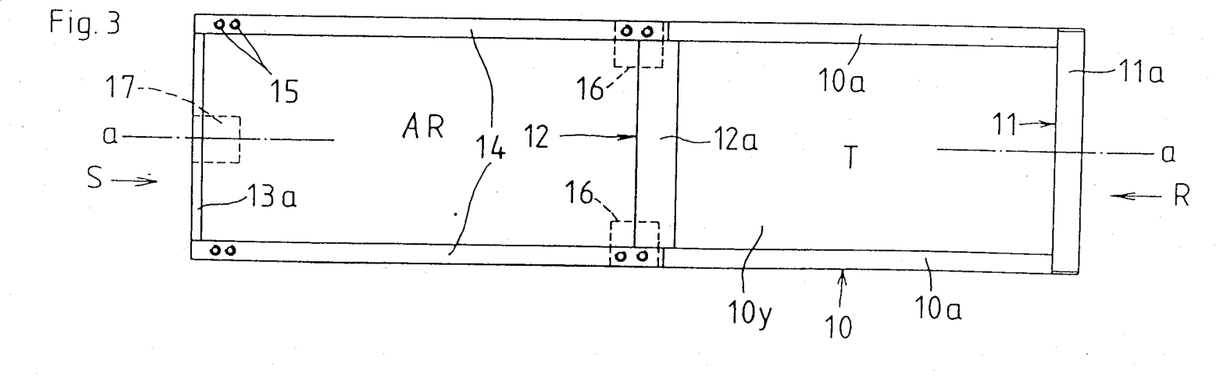
FIG. 3 shows the machine base of FIG. 1 in a plan view.

Referring to FIGS. 1-3 of the drawing and, more particularly, to FIG. 1, it can be seen that the invention proposes a machine base for an injection molding machine which is manufactured of heavy-gauge steel sheet. The machine base consists essentially of four die-cut and die-formed components 10-13 which are welded together to form a rigid structure. The main component of this structure is a U-shaped base member 10 which forms a bottom wall 10y and two longitudinal side walls 10x. The side walls 10x have their horizontal upper edge portions and their vertical edge portions at the front side S folded inwardly by an angle of 90° and refolded back by a second angle of 90°, so as to form horizontally and vertically aligned intermediate flange portions 10a and vertical parallel edge flange portions 10b on the upper side and on the front side S, respectively, of the base member 10 of the machine base.

On the rear side R of the machine base 10 is arranged a rear end wall 11 which is welded to the side walls 10x and the bottom wall 10y of the base member 10. The rear end wall 11 has on its upper side an edge formation which is similar to the edge formation of the base member 10, consisting of a horizontal intermediate flange portion 11a, in alignment with the horizontal intermediate flange portion 10a of the base member side walls 10x, and a vertical edge flange portion 11b forming the rear upper corner of the machine base. The vertical main panel of the rear end wall 11 is recessed inwardly from the rear extremity of the machine base by a distance which corresponds to the width of its horizontal intermediate flange portion 11a.

The front side S of the machine base is open, the opening being bordered by the earlier-mentioned vertical flange formations 10a, 10b of the base member side walls 10x and bottom wall 10y and by a narrow cross brace 13 which extends between the upper front corners of the base member side walls 10x. The cross brace 13 consists of a vertical wall portion in alignment with the vertical intermediate flange portions 10a on the front side S and upper and lower edge portions which are folded inwardly at an angle of 90° to form horizontal edge flange portions 13a. The upper edge flange portion 13a of the cross brace 13 is aligned with the horizontal intermediate flange portions 10a of the base member side walls 10x.

At about mid-length of the machine base is arranged a vertical partition wall 12 which, like the rear end wall 11, is welded to the side walls 10x and to the bottom wall 10y of the base member 10. Its upper edge portion is similarly folded into an edge formation with a horizontal intermediate flange portion 12a and a vertical edge flange portion 12b. The intermediate flange portion 12a is aligned with the horizontal intermediate edge flange portions 10a of the base member side walls 10x. The partition wall 12, the rear end wall 11, and the side walls 10x of the base member 10 form the four vertical walls of a chamber or receptacle which serves as a fluid reservoir of tank T for the hydraulic fluid of the injection molding machine. The remainder of the machine base forms a forwardly open chamber AR underneath the die closing unit (FIG. 4).

The horizontal intermediate flange portions 10a of the base member side walls 10x carry two horizontal guide rails 14 which extend from the front end of the machine base to the partition wall 12 at mid-length of the machine base. The guide rails 14 have the same width as the intermediate flange portions 10a (FIG. 8) and they are attached to the latter by means of longitudinal welds.

The machine base is arranged for a three-point support on the floor. For this purpose, it has two transversely spaced floor pads 16 at mid-length of the machine base, underneath the partition wall 12, and a single floor pad 17 which is arranged centrally underneath the front edge of the base member bottom wall 10y. The machine base is symmetrical with respect to a vertical longitudinal plane, and its threepoint support on the floor pads 16 and 17 assures that the machine base will remain free of torsion stress, even if it rests on an uneven floor.

Figure 4:
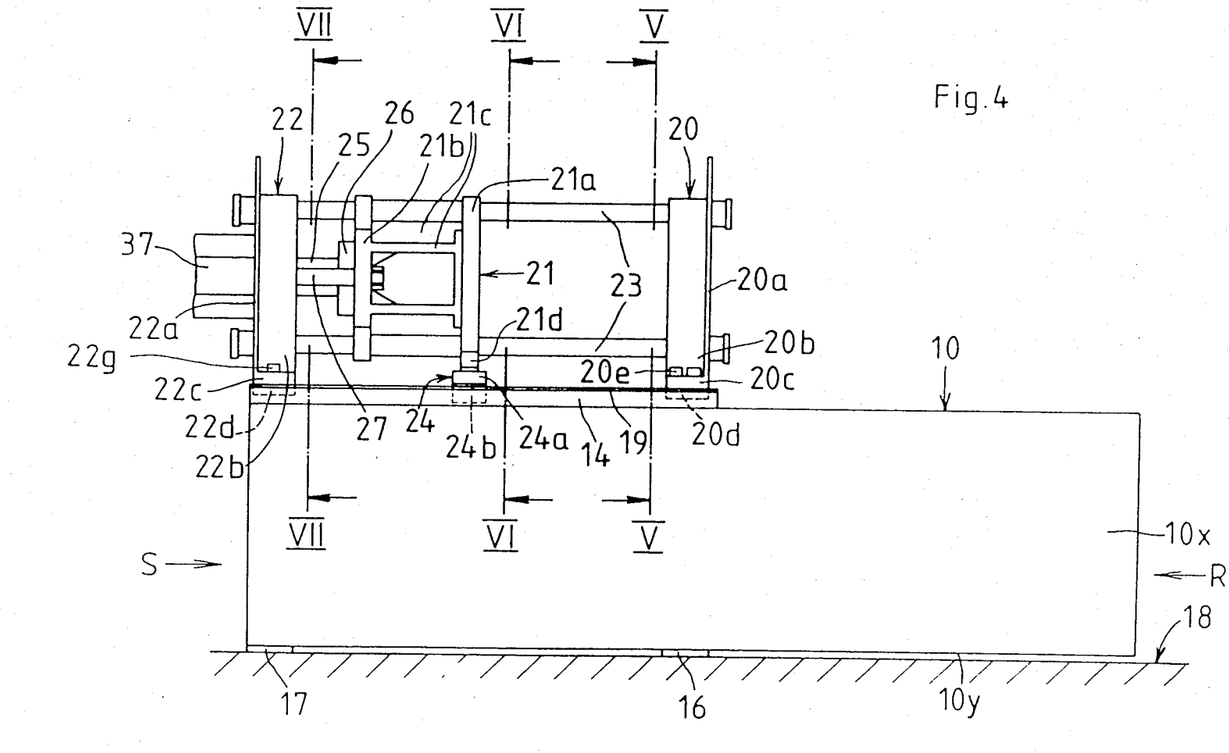
FIG. 4 shows, in an elevational view, a die closing unit mounted on the machine base of FIG. 1, in a mounting arrangement which embodies the present invention.

FIG. 4 shows the machine base of FIGS. 1-3 with a die closing unit mounted on its two guide rails 14. The die closing unit consists essentially of a stationary die carrier plate 20, a movable die carrier frame 21, and a stationary cylinder head plate 22 carrying a hydraulic actuator assembly 37. The stationary die carrier plate 20 and the cylinder head plate 22 are linked together by means of four parallel tie rods 23 which have their extremities clamped to the two plates.

The hydraulic actuator assembly 37 includes a central power piston with a piston rod 25 engaging a pressure transfer wall 21b of the movable die carrier frame 21 by means of a piston base plate 26. The piston rod 27 of a travel cylinder is connected directly to the pressure transfer wall 21b. Spaced at an axial distance from the latter is the die mounting wall 21a of the movable die carrier frame, the two walls being connected by means of several pressure transfer ribs 21c. Guide bushings in the pressure transfer wall 21b and in the die mounting wall 21a engage the four tie rods 23.

Figure 5:
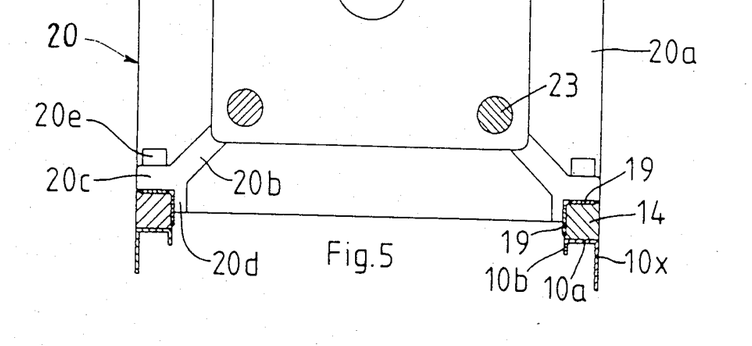
FIG. 5 is an enlarged partial transverse cross section taken along line V—V of FIG. 4.
Figure 6:
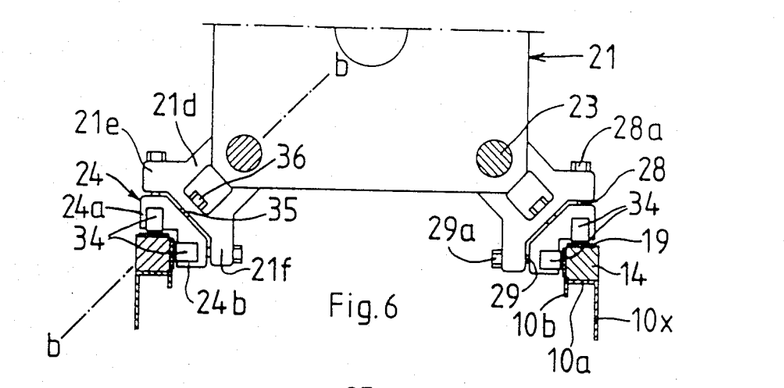
FIG. 6 is a similar cross section taken along line VI—VI of FIG. 4.
Figure 7:
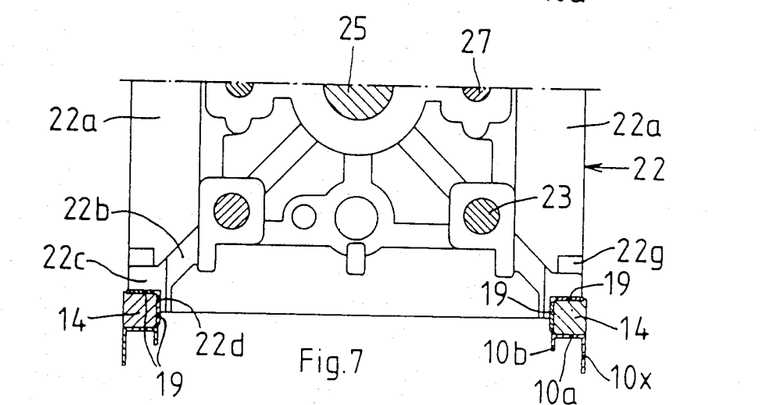
FIG. 7 is a similar cross section taken along line VII—VII of FIG. 4.
Figure 8:
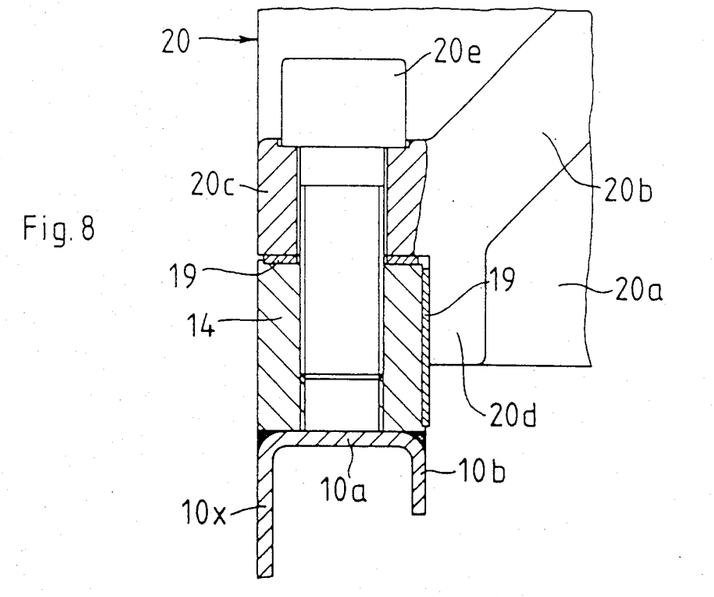
FIG. 8 shows a further enlarged detail of FIG. 5 with additional portions cross-sectioned.
Figure 9:
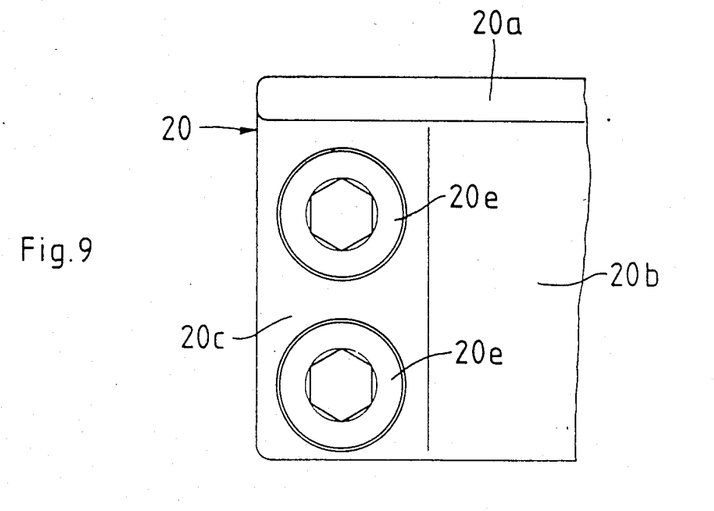
FIG. 9 shows the detail of FIG. 8 in a corresponding plan view.
Figure 10:
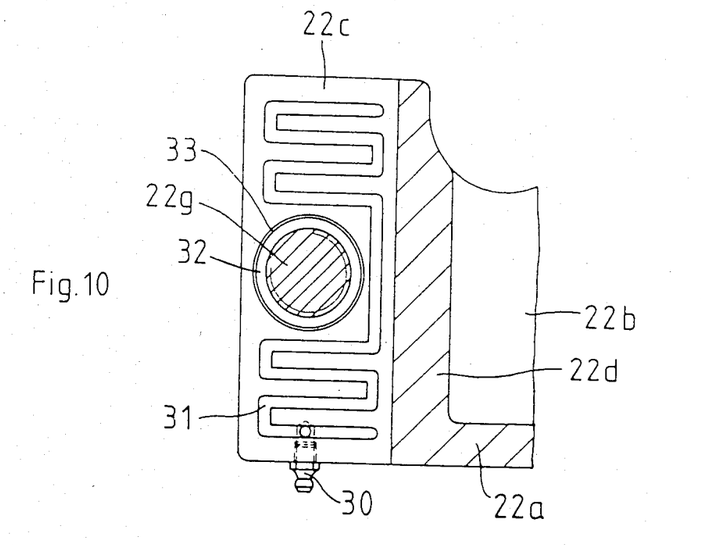
FIG. 10 is a horizontal cross section taken along line X—X of FIG. 11.
Figure 11:
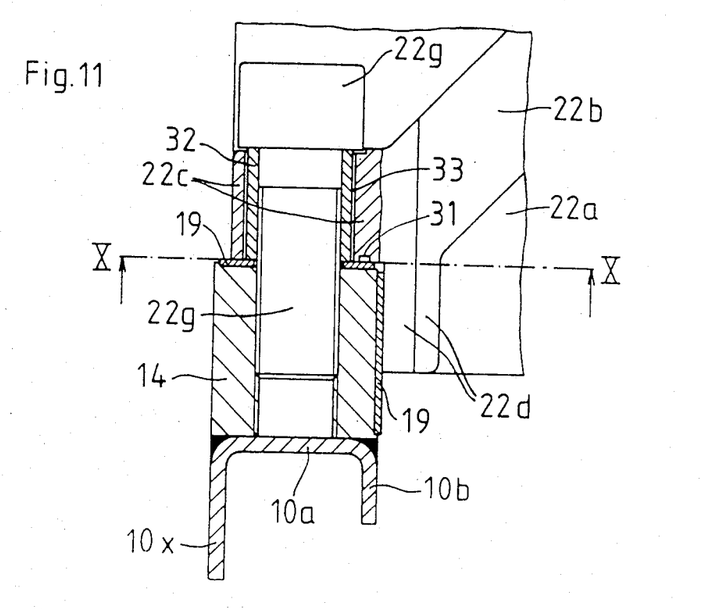
FIG. 11 shows a further enlarged detail of FIG. 7 with additional portions cross-sectioned.

The two stationary plates 20 and 22, as well as the movable die carrier frame 21, are positioned and/or guided by the two guide rails 14, as can be seen in more detail in FIGS. 5 through 11: FIGS. 5, 8 and 9 show the mounting of the stationary die carrier plate 20 on the guide rails 19; FIG. 6 shows the support and guidance of the movable die carrier frame 21 on the guide rails 14; and FIGS. 7, 10 and 11 show the mounting of the stationary cylinder head plate 22 on the guide rails 14.

The two guide rails 14 are of square cross section, their upper horizontal faces and their inner vertical faces being covered with hardened runway strips 19. The stationary die carrier plate 20 engages the guide rails 14 with two inclined mounting struts 20b which extend diagonally along a reinforcing shield 20a of the stationary die carrier plate 20. The inclined mounting struts 20b bifurcate into horizontal and vertical heel portions 20c and 20d, respectively, with which they engage the horizontal and vertical runway strips 19 of the guide rails 14. The axial extent of the inclined mounting struts is the same as that of the die carrier plate 20 itself, the horizontal heel portion 20c being considerably thicker than the vertical heel portion 20d, in order to accommodate two attachment bolts 20e (FIGS. 8 and 9).

The stationary cylinder head plate 22 has similar inclined mounting struts 22b with horizontal and vertical heel portions 22c and 22d, respectively, which likewise engage the runway strips 19 of the guide rails 14. The inclined mounting struts 22b are backed up by a reinforcing shield 22a of plate 22, and the axial extent of the mounting struts 22b is again the same as that of the cylinder head plate 22 itself.

The mounting of the stationary cylinder head plate 22 differs from that of the stationary die carrier plate 20, in that the former is not clamped to the guide rails 14, but is free to execute small axial displacements in relation thereto, as is illustrated in FIGS. 10 and 11. A single vertical bolt 22g is arranged at mid-length of the horizontal heel portion 22c, clamping a spacer sleeve 32 against the horizontal runway strip 19. The spacer sleeve 32 is slightly longer than the thickness of the heel portion 22c, so that the latter is not being touched by the head of the bolt 22g. The spacer sleeve 32 forms an annular gap 33 with the bore in the horizontal heel portion 22c, so that the cylinder head plate 22 can move axially on the guide rail 14 within the radial width of the annular gap 33.

While it would thus be possible for the cylinder head plate to be lifted off the horizontal runway strip 19, the weight of the plate 22, and especially of the overhanging hydraulic cylinder assembly 37, assures that this will not be the case. For lubrication purposes, the underside of the horizontal heel portion 22 (FIG. 10) is provided with a lubrication groove 31 of zigzag outline to which lubricant is supplied from a nipple 30.

The limited axial displacement freedom of the stationary cylinder head plate 22 on the guide rails 14 accommodates the elongation which is produced on the four tie rods 23, when the full closing pressure is applied to the injection molding die (not shown) by the hydraulic cylinder assembly 37. This compensatory displacement takes place during each injection cycle.

The movable die carrier frame 21 is comparable to the stationary plates 20 and 22 in that it, too, has inclined struts 21d with horizontal and vertical heel portions 21e and 21f, respectively. However, these heel portions do not directly engage the guide rails 14, but rest adjustably on horizontal and vertical faces of two guide bogies 24. The two guide bogies are entrained to move with the movable die carrier frame 21 by means of key pins 35 which are secured by counter-nuts 36. The key pins 35 transmit only axial forces to the two guide bogies 24.

Each guide bogie 24 has a horizontal leg 24a holding a roller track cassette 34 in engagement with the horizontal runway strip 19 of rail 14 and a vertical leg 24b holding a second roller track cassette 34 in engagement with the vertical runway strip 19. Vertical adjustment screws 28 with counter-nuts 28a and horizontal adjustment screws 29 with counter-nuts 29a make it possible to adjust the guide configuration between the movable die carrier frame 21 and the guide rails 14 in such a way that the frame 21 is positioned to transfer the entire, or substantially the entire, load-carrying and lateral guidance functions from the tie rods 23 to the guide rails 14. This guide configuration is the subject of a separate patent application, filed Jan. 21, 1982, under Ser. No. 341,260, U.S. Pat. No. 4,453,912.

The mounting configuration of the present invention, by using the same horizontal and vertical faces of the two guide rails 14 for the positioning and/or guidance of the two stationary plates 20 and 22 and the movable frame 21 of the die closing unit, establishes an adjustment-free, positively centered mounting position for the two plates 20 and 22, so that a precision-alignment between these plates and their tie rods 23, on the one hand, and the two guide rails 14, on the other hand, is guaranteed. The limited displacement freedom of the stationary cylinder head plate 22 on the guide rails 14 furthermore assures an even distribution of the tensile stress and consequent elongation over the four tie rods 23, so that a very high degree of die alignment accuracy is achieved. The hardened runway strips 19 of the two guide rails 14, rather than being separate strips, may also be in the form of a single part in the shape of an angle.

It should be understood, of course, that the foregoing disclosure describes only a preferred embodiment of the invention and that it is intended to cover all changes and modifications of this example of the invention which fall within the scope of the appended claims.

I claim the following:

1. A mounting arrangement for a die closing unit on the machine base of an injection molding machine, wherein the machine base is an elongated rigid structure with an upper side to which are attached two laterally spaced parallel longitudinal guide rails, the guide rails having horizontal guide faces defining a common horizontal mounting and guiding plane and oppositely inwardly facing parallel vertical guide faces defining centering and guiding flanks;

the guide rails are located on opposite sides of a vertical longitudinal center plane which is the center plane for the machine base and for the die closing unit;

the die closing unit comprises a rigid stationary assembly constituted by a transversely oriented stationary die carrier plate adapted for the attachment of a stationary die half thereto, an axially spaced likewise transversely oriented stationary cylinder head plate with a hydraulic actuator assembly attached thereto, and a plurality of parallel axially extending tie rods having their extremities attached to both of said axially spaced stationary plates;

the die closing unit further comprises a movable die carrier frame adapted for the attachment of a movable die half thereto and connected to said hydraulic actuator assembly to be driven by the latter in axial die closing and die opening movements, the tie rods reaching through guide bores of the movable die carrier frame;

the stationary die carrier plate and the stationary cylinder head plate each have two outwardly extending horizontal heel portions engaging the horizontal guide faces of the guide rails and two downwardly extending vertical heel portions engaging the vertical guide faces of the guide rails, so as to create a predetermined alignment relationship between said rigid stationary assembly and the two guide rails, one of said two stationary plates having its horizontal heel portions clamped to the horizontal guide faces of the guide rails, and the other plate being free to execute small axial displacements in guided engagement with the guide rails, in response to tensile-stress-induced elongation of the tie rods; and said stationary plate which is free to execute axial displacements has its horizontal heel portions engaged against the horizontal guide faces of the two guide rails by virtue of the weight of said plate and components carried by it, said plate including, in each horizontal heel portion, a vertical bore, a spacer sleeve positioned in said bore so as to form an annular displacement gap therewith, and a bolt reaching vertically through the spacer sleeve to clamp it to the horizontal guide face of the guide rail.

2. A mounting arrangement as defined in claim 1, wherein each of said bolts has a head of a diameter which reaches over a bore-surrounding portion of the associated horizontal heel portion; and the spacer sleeve is of such a vertical length that a small vertical clearance is maintained between the bolt head and said bore-surrounding heel portion.

3. A mounting arrangement as defined in claim 2, wherein said stationary plate which has its horizontal heel portions clamped to the horizontal guide faces of the guide rails is the stationary die carrier plate; and said stationary plate which is free to execute axial displacements is the cylinder head plate.

4. A mounting arrangement as defined in claim 1, wherein said free stationary plate further includes, on the underside of each horizontal heel portion with which it engages a horizontal guide face of a guide rail, a lubrication groove of zigzag outline and means for supplying lubricant to said groove.

5. A mounting arrangement as defined in claim 1, wherein the stationary die carrier plate and the stationary cylinder head plate each have two downwardly and outwardly inclined struts bifurcating into said horizontal and vertical heel portions; and each of said plates further includes a reinforcing shield extending on one axial side of the inclined struts so as to adjoin and reinforce the latter and their horizontal and vertical heel portions.

6. A mounting arrangement as defined in claim 5, wherein the stationary die carrier plate, the cylinder head plate, and the movable die carrier frame are all substantially square in outline;

the die closing unit has four tie rods, the axes of which are located at the four corners of a square;

the two guide rails are in approximate alignment with two diagonal planes defined by the two pairs of diagonally oppositely located tie rods; and the inclined struts of the two stationary plates extend from the lower corners of said plates in approximate alignment with said diagonal planes.

7. A mounting arrangement as defined in claim 5, wherein the axial length of the horizontal and vertical heel portions of each of the two stationary plates is substantially equal to the axial width of the plate which they are part of.

8. A mounting arrangement as defined in claim 1, wherein the movable die carrier frame and the guide faces of the two guide rails define exterior guiding means for the movable die carrier frame which are adjustable so as to at least substantially relieve the tie rods of their frame-carrying function.

9. A mounting arrangement as defined in claim 8, wherein the exterior guiding means for the movable die carrier frame includes a guide member associated with each guide rail and connected to said frame, so as to be entrained by the latter in its axial movements, each guide member engaging the horizontal and vertical guide faces of a guide rail; and the position of each guide member in relation to the movable die carrier frame is adjustable vertically and horizontally, at right angles to the guide faces of the guide rails.

10. A mounting arrangement as defined in claim 9, wherein the two guide members of the exterior guiding means are two guide bogies, each holding a pair of roller track cassettes in engagement with the horizontal and vertical guide faces of the two guide rails by means of a plurality of recirculating bearing rollers.

11. A mounting arrangement as defined in claim 9, wherein the two guide rails include hardened runway strips forming their horizontal and vertical guide faces.

12. A mounting arrangement for a die closing unit on the machine base of an injection molding machine, wherein the machine base is an elongated rigid structure of welded sheet metal, said structure including a U-shaped base member with a bottom wall and two vertical longitudinal side walls interconnected near their upper edges by means of transversely extending bracing members, the upper edges of the side walls being folded inwardly to form horizontally aligned flange portions and refolded downwardly to from vertical edge flange portions, said machine base structure further including two laterally spaced parallel longitudinal guide rails welded to the upper sides of said horizontal flange portions, the guide rails having horizontal guide faces defining a common horizontal mounting and guiding plane and oppositely inwardly facing parallel vertical guide faces defining centering and guiding flanks;

the guide rails are arranged symmetrically with respect to a vertical longitudinal center plane which is the center plane for the machine base and for the die closing unit;

the die closing unit comprises a rigid stationary assembly constituted of a transversely oriented stationary die carrier plate adapted for the attachment of a stationary die half thereto, an axially spaced likewise transversely oriented cylinder head plate with a hydraulic actuator assembly attached thereto, and a plurality of parallel axially oriented tie rods having their extremities attached to both of said axially spaced plates;

the die closing unit further comprises a movable die carrier frame adapted for the attachment of a movable die half thereto and connected to said hydraulic actuator assembly, to be driven by the latter in axial die closing and die opening movements, the tie rods reaching through guide bores of the movable die carrier frame;

the stationary die carrier plate and the cylinder head plate each have two outwardly extending horizontal heel portions engaging the horizontal guide faces of the guide rails and two downwardly extending vertical heel portions engaging the vertical guide faces of the guide rails, so as to create a predetermined alignment relationship between said rigid stationary assembly and the two guide rails, one of said two plates having its horizontal heel portions clamped to the horizontal guide faces of the guide rails, and the other plate being free to execute small axial displacements in guided engagement with the guide rails, in response to tensile-stress-induced elongation of the tie rods;

both stationary plates have downwardly and outwardly inclined struts which bifurcate into said horizontal and vertical heel portions;

the displaceable stationary plate includes, in each of its horizontal heel portions, a vertical bore, a spacer sleeve positioned in said bore so as to form an annular displacement gap therewith, and a bolt clamping the spacer sleeve to the horizontal guide face of the guide rail while engaging a threaded bore in the latter; and each of said plates further includes a reinforcing shield extending on one axial side of the inclined struts so as to adjoin and reinforce the latter and their horizontal and vertical heel portions.

13. A mounting arrangement as defined in claim 12, wherein the stationary plate which is free to execute axial displacements is the cylinder head plate; and the stationary plate which has its horizontal heel portions clamped to the horizontal guide faces of the guide rails is the stationary die carrier plate, said clamped plate including at least one vertical bore in each horizontal heel portion and a vertical clamping bolt reaching therethrough into a threaded bore in the guide rail.

14. A mounting arrangement as defined in claim 12, wherein each of said bolts has a head of a diameter which reaches over a bore-surrounding portion of the associated horizontal heel portion; and the spacer sleeve is of such a vertical length that a small vertical clearance is maintained between the bolt head and said bore-surrounding heel portion.

15. A mounting arrangement as defined in claim 12, wherein said free stationary plate further includes, on the underside of each horizontal heel portion with which it engages a horizontal guide face of a guide rail, a lubrication groove of zigzag outline and means for supplying lubricant to said groove.

* * * * *